March 5, 1929.  L. A. H. MERRIHEW  1,704,398

STEAM TRAP

Filed Dec. 29, 1923  2 Sheets-Sheet 1

INVENTOR
Leland A. H. Merrihew
by Wright, Brown, Quinby & May
att'ys

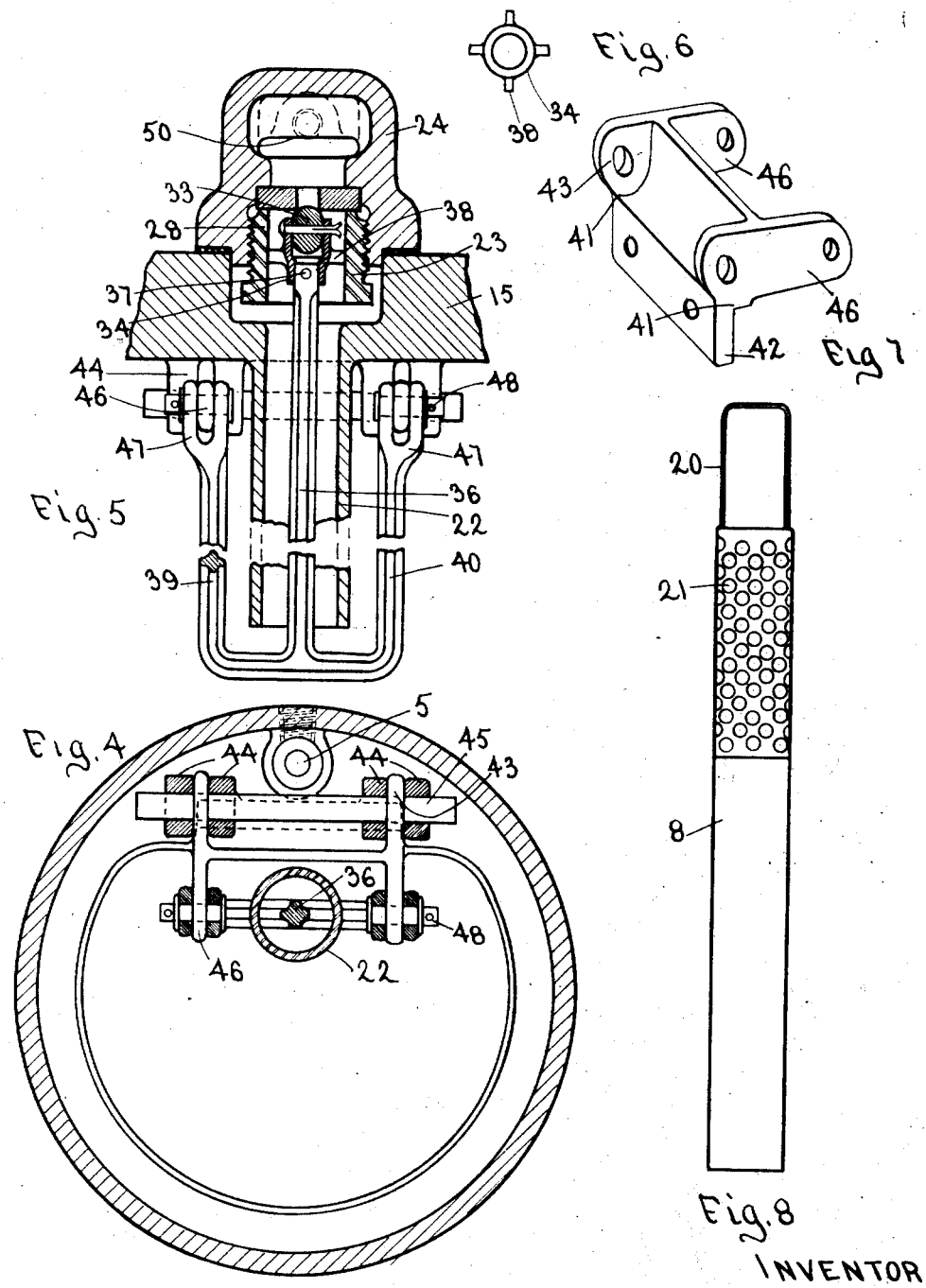

Patented Mar. 5, 1929.

1,704,398

UNITED STATES PATENT OFFICE.

LELAND A. H. MERRIHEW, OF CAMBRIDGE, MASSACHUSETTS.

STEAM TRAP.

Application filed December 29, 1923. Serial No. 683,472.

The object of this invention is to improve the construction and mode of operation of steam traps to such effect that the trap body will be more compact, stronger and capable of being made at less cost than those heretofore used; that, other things being equal, the valve action will be more powerful and efficient; that the water entering will be strained and the sediment so restrained may be removed without opening the trap or interrupting its operation; that various other useful results may be obtained, as will fully appear from the detailed description of my improved trap and its characteristics, in the following specification.

Referring to the drawings:—

Figure 4 is a horizontal cross section taken approximately on the line 3—3 of Figure 2 and being slightly enlarged as to scale.

Figure 5 is a detail sectional view showing the trap valve and its seat, and the connections between the valve and bucket of the trap.

Figure 6 is a detail cross section of the valve holder.

Figure 7 is a perspective view of the casting which forms part of the bucket hinge and valve rod hinge.

Figure 8 is an elevation of the strainer by which the entering water is strained.

The same reference characters designate the same parts wherever they occur in all the figures.

Figure 1:
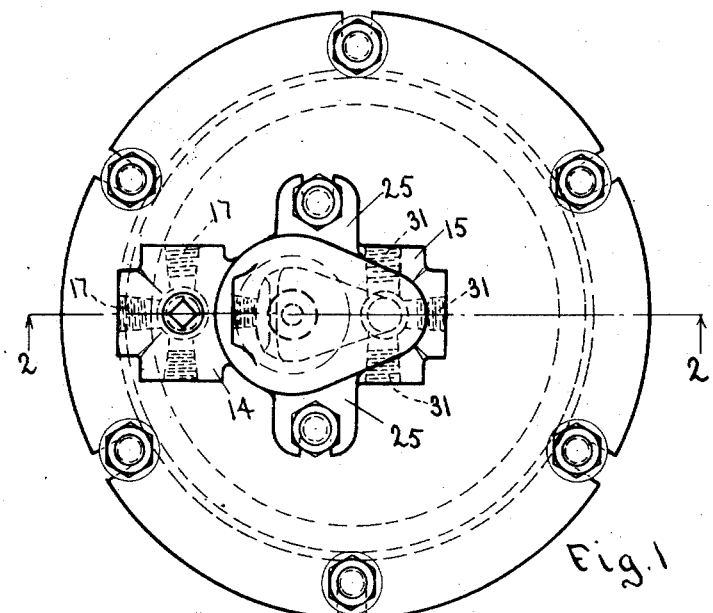
Figure 1 is a plan view of a steam trap embodying the present invention.

The body of the trap is represented in these drawings by the numeral 1. It is preferably made as a casting of simple form with a flange 4, surrounding its top edge for attachment of a cover, and with a passage 5 in its lower part to serve as a sediment pocket and as a discharge passage for sediment.

The outer end of the passage 5 opens through the rear wall of the trap body and its inner end terminates in an orifice which lies in a horizontal plane; that part of the wall of the body which contains the passage being made thicker than other parts to permit this formation. In its upper part the passage is enlarged to form a tapered pocket 6 and a shoulder or ledge 7 which are adapted to receive and support the lower end of the combined strainer and sediment retainer 8 which will later be described in detail.

In the outer orifice of the sediment passage 5 is a stop cock 9. A blowout passage 10 is provided in another part of the body near its bottom for draining the trap when desired. This passage is equipped with a cock or valve, not shown.

The top of the trap is closed by a cover 11 having a flange 12 and being secured by bolts 13 to the body flange 4 in the manner usual with structures of this sort. On the upper or outer side of the cover are bosses 14 and 15. The former contains the inlet passage and the latter contains a part of the outlet passage. The inlet passage includes a chamber 16, from which, preferably, a number of branches 17 lead outwardly to different sides of the boss 14, as indicated in Figure 1, this being for convenience in connecting the trap with the piping to be drained of water. To any one of these branches a pipe may be connected while the others are closed by plugs. Another branch 18 opens from the chamber 16 into the interior of the trap. Preferably this passage is located directly over the pocket 6; and in the top of the boss 14 is an opening in line with the passage 18, which is normally closed by a plug 19. The arrangement of these openings is such that when the plug 19 is removed the strainer 8 may be placed in the trap, or withdrawn. While the most convenient arrangement to serve this purpose is to place the inlet passage vertically over the pocket 6, yet substantially the desired results can be obtained by placing the strainer in an inclined position, wherefore I do not limit my claim to the vertical alinement of inlet passage and sediment pocket, but claim as part of the invention any arrangement which permits placing and mounting a strainer of the sort hereinafter described in substantially the manner above described.

Referring again to the strainer, this is a tube open at both ends and of such length that while its lower end rests on the shoulder 7 in the sediment passage, its upper end enters the inlet passage 18. An extension 20, preferably made as a wire bail rigidly united to the upper end of the strainer tube, rises to the plug 19 and abuts on the latter so as to retain the lower end of the tube in the pocket 6. The upper part of the strainer, from a level approximating the low water level in the trap to the under side of the cover, is formed with numerous small holes 21 through which water may pass, and of which the dimensions are too small to pass particles of sediment or scale, or other foreign matter large enough to plug up the valve or to wedge between the valve body and its seat. The diameter of the strainer tube where it lies in the passage 18 is large enough to fill such passage substantially and prevent solid matter in particles of any appreciable size from passing outside of the strainer, compelling practically all the water entering the trap to pass through the strainer. Preferably also the upper end of the strainer tube is below the entrance branches 17, and this end is wide open, in order to diminish to the minimum the resistance opposed to the entrance of water.

I would say that, although I have described the preferred construction of strainer, various modifications in its structural features might be made within the scope in which I claim protection. The characteristics, however, which are essentials of the invention are that the tube is a strainer in its upper part and that it is impervious in its lower part and forms a conduit leading to the sediment passage. Hence all of the sediment which is strained from the water remains in the tube and is conducted to the passage 5, from which it may be discharged at any time by merely opening the cock 9. Then the pressure of steam in the pipe leading to the trap blows out all the matter accumulated in the tube and discharge passage. Thus it is not necessary to take off the cover or even interrupt the operation of the trap in order to remove sediment. This fact should be noted that the lower limit of the perforations in the strainer is preferably at or near the lower water level in the trap, in order that when the sediment is blown out of the strainer tube, the water in the trap will not be blown out also, but enough water will remain to hold the bucket hereinafter described, in its raised position, and therefore hold the valve closed so that steam will not escape and be wasted through the eduction passage. If the holes in the strainer should become stopped up beyond power of the steam pressure to clear them, the strainer can be removed for cleaning by simply first removing the plug 19 and without need of taking off the cover or disconnecting the piping leading to the trap.

Projecting downward from the cover 11 into the trap body is a tube 22, which forms the discharge tube of the trap, and the bore of which opens into a chamber 23 in the upper side of the cover between the bosses 14 and 15. This chamber is closed by a cap 24 having lugs 25 which are secured to the cover by bolts as shown in Figure 1. The cap is constructed with a shoulder 25 against which a disk 26, having a central passage through it, is confined by an internal nut 28, which also serves as a guide for the valve holder presently described. This disk is reversible in position, and the intersections of each end of its passage with the adjacent face of the disk forms a valve seat 27 complemental to the after mentioned valve. The opening in the valve seat disk 26 leads from the chamber 23 to a passage 29 in the cap, and the latter passage opens into an orifice 30 in the boss 15 previously mentioned, which contains the balance of the outlet passage from the tube. Preferably in this boss there are three, more or less, branches 31, forming alternative extremities of the outlet passage, to either of which a pipe may be connected while the others are plugged up.

A tilting bucket 32 is supported by the cover 11 and is connected to the valve of the trap in a manner which is hereinafter described. Referring first to the valve; this is shown at 33 and is preferably spherical at the end which makes contact with the valve seat 27. It is mounted in a holder 34 in which it is held by a pin 35, and is preferably alike at both ends and reversible, so that either end may cooperate with the valve seat. The holder 34 is mounted loosely on a valve rod 36 to which it is connected by a pin 37, preferably at right angles to the pin 35. By thus connecting the valve loosely with the valve rod through pins at right angles to each other, a sort of universal joint is provided which, aided by the spherical shape of the valve itself, allows the valve to find an accurate and tight bearing on the entire seat even though the valve rod should not be perfectly alined with the valve seat.

The holder also is formed with arms or wings 38 (see Figs. 5 and 6) which bear on the inner surface of the guide nut 28 and guide the valve in its closing movement.

The valve rod 36 extends through, and protrudes from the bottom of, the discharge tube 22, being there connected with two arms 39 and 40 which rise parallel to the valve rod at respectively opposite sides of the tube, the arrangement of which is best shown in Figures 4 and 5. Preferably the valve rod and connected arms are made as a single malleable casting, but various other types and forms of construction are possible and are within the scope of my claims.

A fitting 41, which is preferably a casting, and is preferably made substantially as shown in Figure 7, serves both as the hinge for the bucket and the means for imparting movement from the bucket to the valve. This fitting is made with a web 42 which is fastened to the rear wall of the bucket at the upper edge thereof, and it also has webs 43 which lie between or beside lugs 44 which project downward from the cover. A hinge rod or pintle 45 passes through alined holes in the webs 43 and lugs 44, providing the pivot for the bucket. The fitting 41 also has arms 46 projecting on either side of the discharge tube 22, and entering the forked ends 47 of the arms 39 and 40, to which they are connected by pintles 48. These pintles are in line with one another and are preferably in the same vertical plane with the center of the valve.

Figures 2, 3:
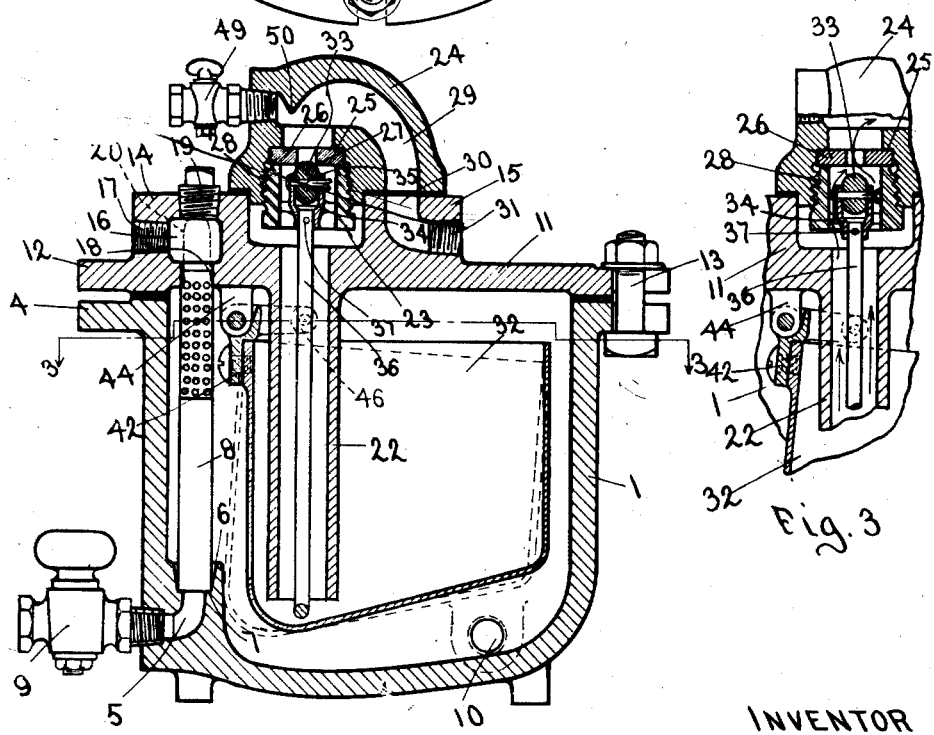
Figure 2 is a central section of the trap taken on the line 2—2 of Figure 1.
Figure 3 is a fragmentary view showing the valve in open position.

The bucket is deepest in the part directly beneath the discharge tube 22 and its bottom is inclined downward from all points in its periphery toward this deepest point. This deepest or lowest part is also near the rear side of the bucket, and the pivot 45 is near the discharge tube. The bucket may tilt about said pivot until its rear side is arrested by the adjacent part of the trap body, as shown by dotted lines in Fig. 2; and the slope of the bucket bottom from all points of its periphery to the deepest point is so steep that when thus tilted, the part of the bucket under the discharge tube and containing the lower end of the tube will still be the deepest part and a rapid drainage of water to this point from all other parts of the bucket will occur.

In the cap 24, and opening through one of its sides, is a test outlet equipped with a try-cock 49, the purpose of which is to detect leakage of steam when the valve is seated. A baffle 50 is formed in the roof of the passage 29 between the test outlet and the line in which water passes the valve 33; that is, at a location where it will deflect water toward the outlet and prevent its being forced out of the try-cock in case the trap should release its contents while the try-cock is open. The baffle also provides a smooth passage facilitating discharge flow of water.

The operation of the trap in accumulating water of condensation and periodically discharging the water, is substantially the same as that of the hinged open bucket type of steam trap already known. It is sufficient for present purposes to note the novel features of my invention and their advantages.

First: The bucket is hinged at its top; and the hinge connection between the bucket and the valve is above the top of the bucket. Thus all joints where movement occurs are above the water line of the trap and free from any possibility of having dirt or grit deposited on them. This location of the bucket hinge also permits the hinge to be placed nearer the line of the valve than is possible where buckets are hinged at their bottoms, and thereby causes the weight of the bucket, other things being equal, to exert a more powerful leverage in opening the valve, and enables a larger valve to be used, thus increasing the discharge capacity of the trap.

Second: The sloping construction of the bucket bottom does away with any residual body of water which must be lifted by the buoyancy of the bucket in order to close the valve after the trap has been discharged. As a result of eliminating any pocket in which such a body of water can remain, it is possible to make the bucket heavier at its outer extremity than heretofore and further increase its valve-opening leverage.

Third: The strainer having the characteristics already fully described is an important feature of the invention due to the fact that the restained sediment can be discharged without need of opening the trap or interrupting its operation.

Fourth: The fact that the inlet and outlet are in the cover of the trap, and that neither is in the body, is an advantage, in that the piping is simplified because inlet and outlet pipes are at the same level; that the entire trap may be made shorter because the bucket may be placed close under the cover instead of below some point in the side of the trap body where the inlet previously has been located; that the cover absorbs all stresses applied by the piping and relieves the flanges and cover bolts of strains and liability to breakage from such stresses; and that the form of the body itself is so simplified, that it can be cast in a sand mold without any dry sand core.

Fifth: The construction of the cap with the test outlet in its side is a new feature, and in connection with the baffle between the test outlet and the line of water flow from the valve is of great importance in preventing any forcible discharge of hot water from the test outlet such as might scald, or otherwise cause injury to the observer.

Sixth: Both the disk 26 which furnishes the valve seat, and the valve itself, are reversible, giving at least twice as much wear and service as non-reversible valves and seats.

What I claim and desire to secure by Letters Patent is:

1. A steam trap having a casing provided with an inlet passage and constructed with an external boss through which said passage extends, the outer part of said passage being divided into a number of branches opening externally of the casing at different sides of said boss for connection with pipes leading to the trap from different directions.

2. A steam trap comprising a body having an interior chamber, and provided with a sediment discharge passage in its lower part, the inner terminal of which passage forms an upwardly facing pocket, the top part of the trap having an inlet passage opening downwardly into said chamber and having also a laterally extending entrance to said passage and a normally closed opening in substantial alinement with said pocket and with the inner opening of the entrance passage, a detachable plug for closing said normally closed opening, and a tube adapted to pass through said normally closed opening and having such length that it extends from the inner opening of the entrance passage to said upwardly facing pocket; said tube being perforated to serve as a strainer in the part adjacent to the inlet passage and being impervious in the part adjacent to the discharge passage, whereby to serve as a sediment retainer and conduit, and being provided with an extension adapted to abut against said plug and hold the lower end of the tube in the discharge passage.

3. A steam trap comprising a body having a top wall and a discharge tube extending downwardly from said top wall, a bucket pivoted at a point above its upper edge to said top wall close to said discharge tube, a valve for controlling the discharge of water from the trap, and a connection between said valve and bucket for opening and closing said valve with tilting movement of the bucket.

4. A steam trap comprising an enclosed body including a top wall having a depending interior discharge tube, a bucket enclosing said tube and having a bottom below the lower end of the tube, a discharge controlling valve in said top wall, a valve stem extending downwardly through the tube, an arm extending upwardly outside of the tube to a height above the normal level of water in the trap and being connected with said valve stem, a hinge connection between said bucket at the top of the trap above the said normal water level, and a pivot between the trap and said arm, also above the water level.

5. A steam trap comprising a body having a top wall with a downwardly extending internal discharge tube, a discharge valve having a stem extending downwardly through said tube, arms connected to said stem and rising at opposite sides of the tube to a height above the water level in the trap, an open buoyant bucket embracing said discharge tube, and a fitting secured to the upper part of said bucket and having arms pivoted to the previously named arms, and said fitting also having lugs which are pivoted to the trap structure.

6. A steam trap including a cover having an upwardly directed eduction passage, and a cap having a continuation of said passage with a change in the direction thereof, a valve arranged to obstruct and open that part of the passage which enters said cap, and the cap having a test opening at one side thereof, and being formed with a baffle between said test opening and the continuation of the eduction passage beyond said valve.

In testimony whereof I have affixed my signature.

LELAND A. H. MERRIHEW.